US009938465B2

(12) United States Patent
Dülger et al.

(10) Patent No.: US 9,938,465 B2
(45) Date of Patent: Apr. 10, 2018

(54) APPARATUS FOR PRODUCING HYBRID CARBON BLACK PARTICLES

(71) Applicant: Pyrolyx AG, München (DE)

(72) Inventors: Fikret Dülger, Vienna (AT); Niels Raeder, Tutzing (DE); Holger Merz, Kelkheim (DE)

(73) Assignee: Pyrolyx AG, München (DE)

( * ) Notice: Subject to any disclaimer, the term of this patent is extended or adjusted under 35 U.S.C. 154(b) by 0 days.

(21) Appl. No.: 15/589,425

(22) Filed: May 8, 2017

(65) Prior Publication Data
US 2017/0240813 A1 Aug. 24, 2017

Related U.S. Application Data

(62) Division of application No. 14/411,405, filed as application No. PCT/EP2013/063704 on Jun. 28, 2013, now Pat. No. 9,676,943.

(30) Foreign Application Priority Data

Jun. 29, 2012 (DE) .................. 10 2012 105 796

(51) Int. Cl.
C01B 31/14 (2006.01)
C10B 5/00 (2006.01)
C09C 1/48 (2006.01)
C09C 1/50 (2006.01)
C09C 1/60 (2006.01)
B01J 19/24 (2006.01)
C10B 7/10 (2006.01)
C10B 53/07 (2006.01)
C10B 57/02 (2006.01)
B01J 2/00 (2006.01)

(52) U.S. Cl.
CPC .............. C10B 5/00 (2013.01); B01J 19/24 (2013.01); C09C 1/482 (2013.01); C09C 1/50 (2013.01); C09C 1/60 (2013.01); C10B 7/10 (2013.01); C10B 53/07 (2013.01); C10B 57/02 (2013.01); B01J 2/00 (2013.01); B01J 2219/24 (2013.01); C01P 2004/61 (2013.01)

(58) Field of Classification Search
CPC ............. C01B 31/14; C09C 1/58; C09C 1/60
USPC .......................................................... 23/314
See application file for complete search history.

(56) References Cited

U.S. PATENT DOCUMENTS

| | | | |
|---|---|---|---|
| 2,695,837 A | 11/1954 | Benz | |
| 4,284,616 A | 8/1981 | Solbakken et al. | |
| 6,231,624 B1 | 5/2001 | Vogler et al. | |
| 7,959,726 B2 | 6/2011 | Gaudet | |
| 8,865,112 B2 | 10/2014 | Dulger et al. | |
| 9,676,943 B2 * | 6/2017 | Dulger | C09C 1/60 |
| 2004/0045808 A1 | 3/2004 | Fabry et al. | |
| 2004/0213728 A1 | 10/2004 | Kopietz et al. | |
| 2014/0001293 A1 | 1/2014 | Kawamura et al. | |

FOREIGN PATENT DOCUMENTS

| | | |
|---|---|---|
| CN | 101213263 A | 7/2008 |
| DE | 19623198 A1 | 12/1997 |
| JP | 1972-008442 A | 3/1972 |
| JP | 1982-074365 A | 5/1982 |
| JP | 1992-011664 A | 1/1992 |
| JP | 08027394 A | 1/1996 |
| JP | 1998-060301 A | 3/1998 |
| JP | 2004-323848 A | 11/2004 |
| JP | 2008-545823 A | 12/2008 |
| JP | 2010-274223 A | 12/2010 |
| JP | 2012-001702 A | 1/2012 |
| JP | 5017704 A | 9/2012 |
| JP | 2012-224746 A | 11/2012 |
| RU | 2276170 C2 | 5/2006 |
| RU | 2285025 C2 | 10/2006 |
| SU | 1201294 A1 | 12/1985 |
| WO | 79/00625 A1 | 9/1979 |
| WO | 2006/124774 A2 | 11/2006 |
| WO | 2007/121166 A2 | 10/2007 |
| WO | 2011035812 A1 | 3/2011 |

OTHER PUBLICATIONS

Office Action from Chinese Patent Application No. 201380034851.1 dated Dec. 22, 2015, which is a corresponding application of U.S. Appl. No. 14/411,405 (English translation attached).

International Search Report and Written Opinion of the International Searching Authority in corresponding International Application No. PCT/EP2013/063704, dated Oct. 7, 2013.

English Translation of the International Preliminary Report on Patentability and Written Opinion of the International Searching Authority in corresponding International Application No. PCT/EP2013/063704, dated Jan. 8, 2015.

Office Action from Japanese Application No. 2015-519143 dated Feb. 28, 2017, which is a corresponding application to U.S. Appl. No. 14/411,405 (English translation attached).

(Continued)

Primary Examiner — Edward Johnson
(74) Attorney, Agent, or Firm — Thomas B. Ryan; Harter Secrest & Emery LLP

(57) ABSTRACT

The invention relates to a process for producing hybrid carbon black particles (12), which comprises the steps: a) production of first carbon black starting particles (16); b) production of second carbon black starting particles (22); c) milling of the second carbon black starting particles (22); d) mixing of the second carbon black starting particles (22) into a particle stream (48) of the first carbon black starting particles (16); and d) pelletization of the first and second carbon black starting particles (16, 22) to form hybrid carbon black particles (12). The invention further relates to an apparatus (10) for producing hybrid carbon black particles (12) and to hybrid carbon black particles (12) produced by means of the process or the apparatus (10).

10 Claims, 3 Drawing Sheets

(56) References Cited

OTHER PUBLICATIONS

Office Action from Russian Application No. 2015100232/05(000444) dated Jun. 2, 2017, which is a corresponding application to U.S. Appl. No. 14/411,405 (English translation attached).
Search Report from Russian Application No. 2015100232/05(000444) dated Jun. 1, 2017, which is a corresponding application to U.S. Appl. No. 14/411,405 (English translation attached).
Orlov Production and Use of Carbon Black for Rubbers, Yaroslavl, Alexander Rutman, 2002, 170, lines 3-9, 19-24; p. 171, lines 15-23; p. 172, lines 9-15. See RU Office Action (NPL-5) for relevance.

* cited by examiner

APPARATUS FOR PRODUCING HYBRID CARBON BLACK PARTICLES

TECHNICAL BACKGROUND

The invention relates to a process and to an apparatus for production of carbon black particles.

A known process for producing carbon black or industrial black is called the furnace process, in which a hot gas is first generated in a combustion chamber with controlled supply of air, and then a carbon base material, usually aromatic carbo- or petrochemical oils, is burnt therein at high temperatures, in order thus to generate free carbon, i.e. carbon black. This reaction is stopped abruptly by means of addition of water in the last step of the furnace process, the quenching, at the point when the carbon black particles formed have the desired size and properties.

The carbon black particles produced in this way have a size and structure in the nanometer range and, because of their low density, form a high level of dust and are transportable only with difficulty, and for that reason the quenching is followed directly by a compaction plant in which the carbon black particles are pelletized directly. This exploits the character of the gas/air stream used at the start, since this gas/air stream gives rise to a particle stream of carbon black particles which can be blown directly into the pelletizing system without needing to transport the carbon black particles. In the form of the pellets generated in the pelletizing system, the carbon black produced can then be transported without any problem.

By virtue of recent developments in carbon black production by pyrolysis from used tires, described, for example, in WO 2011/035812 A1, it is possible to obtain relatively pure carbon black in a recycling process as well. This recycled carbon black is less expensive than the standard carbon black produced in the furnace process described above. Therefore, it is desirable to add recycled carbon black to standard carbon black in order thus to be able to provide less expensive starting materials, for example for the tire industry.

Because of the process regime in the pyrolysis, recycled carbon black has different particle sizes. It is therefore ground in order to obtain a defined maximum particle size. Like standard carbon black, the ground recycled carbon black has a very low density and hence a very high volume, and so it has poor storability, conveyability and transportability. For this reason, recycled carbon black can also be pelletized in order that it has better storability, conveyability and transportability.

Simple mixing of different carbon black pellets prior to transport leads to undesirable bursting-open of the pellets as a result of shear forces that act during the mixing. Therefore, the carbon black species are converted back to their original undesirable form with low density and high volume, which is in turn unfavorable for storage, conveying or transport.

It is therefore an object of the invention to propose a process and an apparatus which enable mixing of different carbon black species without the abovementioned disadvantages.

This object is achieved by a process for producing hybrid carbon black particles as claimed in claim 1.

An apparatus for production of hybrid carbon black particles and a hybrid carbon black particle produced by the process are provided by the further independent claims.

Advantageous configurations of the invention are the subject of the dependent claims.

SUMMARY OF THE INVENTION

A process for producing hybrid carbon black particles has the following steps:
a) providing first carbon black base particles;
b) providing second carbon black base particles;
c) grinding the second carbon black base particles;
d) mixing the second carbon black base particles into a particle stream of the first carbon black base particles; and
e) pelletizing the first and second carbon black base particles to give hybrid carbon black particles.

First of all, accordingly, different carbon black species are produced and these are mixed directly with one another. In the course of this, the second carbon black base particles are ground to the desired particle size while being mixed into the particle stream of the first carbon black base particles. Subsequently, the two kinds of carbon black base particles are mixed with one another. Joint pelletization of the first and second carbon black base particles present together in a particle stream forms pellets including both the first carbon black base particles and the second carbon black base particles, such that hybrid carbon black particles of good storability, conveyability and transportability have accordingly been produced.

According to the desired mixing ratio, it is preferably possible to mix between 0% by weight of the second carbon black base particles and 99% by weight of the second carbon black base particles into the particle stream of the first carbon black base particles.

Preferably, the following steps are conducted in step a):
a1) burning a carbon base material in a combustion oven, preferably in a stream of a gas/air mixture at combustion temperatures between 1200° C. and 1800° C.;
a2) rapidly cooling a combustion product stream that forms in step a1), so as to form the first carbon black base particles.

The first carbon black base particles are advantageously produced by means of a furnace process, and the gas/air combustion stream used preferably forms a particle stream of the first carbon black base particles formed, which blows this particle stream directly into a pelletizing system. Prior to the pelletization, the carbon black formed by the combustion is preferably quenched, i.e. cooled very rapidly, such that the very rapid cooling advantageously results in precipitation of particles of a particular particle size in the micrometer range and having particular properties.

Advantageously, a predetermined mixing ratio of the gas/air mixture and the combustion temperature to achieve predetermined qualities of the first carbon black base particles, especially a particle size of about 2 μm to 10 μm, preferably 3 μm to 7 μm, is established.

According to the combustion temperature, different carbon black qualities are formed, since the combustion temperature can preferably be used to control the rate of combustion and hence it is advantageously possible via the combustion rate to control the proportion of contaminating residues in the carbon black formed. For example, the chemical nature of the carbon black base particles also depends on the size of the proportion of gas in the gas/air stream.

Preferably, the rapid cooling is effected by injecting water into the combustion product stream.

Preferably, the carbon base material burnt is aromatic, usually carbo- or petrochemical, oil.

In a preferred configuration, product granules based on carbon are pyrolyzed in step b) in a plurality of heating zones with different temperatures in a reduced pressure atmosphere to give a pyrolysis product, with a dwell time of the product granules in each heating zone of 2 to 4 hours.

More preferably, the product granules are heated in 3 heating zones, preferably with a prevailing temperature in the first heating zone of 100° C. to 200° C., a prevailing temperature in the second heating zone of 200° C. to 350° C., and a prevailing temperature in the third heating zone of 300° C. to 600° C. In this way, and the long dwell time in the individual heating zones, the product granules are preferably pyrolyzed gradually, such that volatile residues are advantageously removed virtually completely from the product granules. The result is preferably very substantially pure recycled carbon black.

The product granules used with preference are comminuted tire wastes. It is thus advantageously possible to create a circuit in which tires which have been produced using carbon black particles are recycled again, for example to give carbon black usable in the tire industry.

In order especially to enable reuse of the recycled carbon black in the tire industry, the pyrolysis product is preferably post-refined at about 800° C.

Preferably, the second carbon black base particles are ground to a particle size of not more than about 5 μm.

This advantageously corresponds roughly to the particle size of the first carbon black base particles which are generated in the legacy oven, such that particularly homogeneous mixing of the two carbon black species can preferably be achieved.

Advantageously, the particle stream of the first and second carbon black base particles, for pelletization of the carbon black base particles to give hybrid carbon black particles, is mixed with water and/or with further additives in step d).

As a result of the water and any further additives, the first and second carbon black base particles advantageously stick firmly together and are preferably thus compacted to give the hybrid carbon black particle in pellet form.

It is preferable that the particle stream is compacted in step e) to at least ½ of its original volume.

The more the volume of the first and second carbon black base particles is preferably reduced, the better the suitability of the pellets produced, for example, for storage, conveying and transport.

Advantageously, the hybrid carbon black particles are dried after step e).

The drying advantageously removes the water added in the course of quenching and pelletizing.

An advantageous hybrid carbon black particle formed from first carbon black base particles and second carbon black base particles is produced by the process described above.

An apparatus for production of hybrid carbon black particles has a production unit for generating a particle stream of first carbon black base particles, a feed unit for feeding second carbon black base particles to the particle stream and a compaction unit for pelletizing the first and second carbon black base particles to give hybrid carbon black particles, wherein the feed unit has a grinding unit for generating the second carbon black base particles by grinding a pyrolysis product based on carbon.

The grinding unit is disposed in the feed unit for grinding of the pyrolysis product, namely of the recycled carbon black, such that the recycled carbon black is advantageously ground directly when it is fed into the particle stream of the first carbon black base particles. The ground second carbon black base particles are then advantageously entrained by the particle stream of the first carbon black base particles generated in the furnace combustion chamber, which overcomes the problem of the large volume or low density of the two carbon black base particles.

Advantageously, a drying unit for drying the hybrid carbon black particles is provided, in order thus preferably to remove water which has been supplied in the process regime from the pellets, in order to advantageously be able to use these in further process steps, for example in tire production, without further processing.

Advantageous configurations of the invention are elucidated in detail hereinafter with reference to the appended drawings.

DESCRIPTION OF THE DRAWINGS

Figure 1:
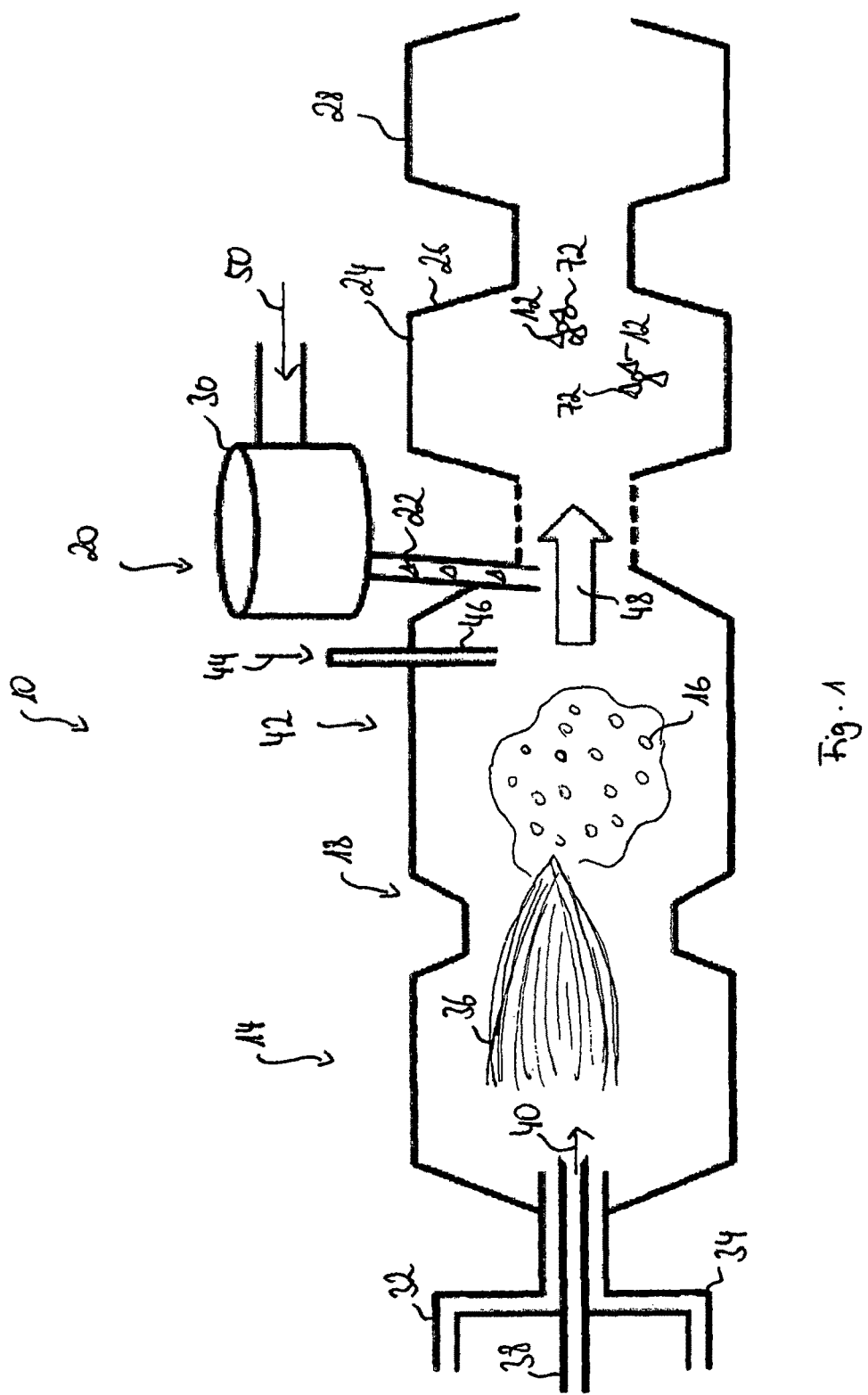
FIG. 1 shows an apparatus for production of hybrid carbon black particles.

FIG. 1 shows an apparatus 10 for production of hybrid carbon black particles 12. The apparatus 10 has a production unit 14 for production of first carbon black base particles 16 in the form of a combustion chamber 18. The apparatus 10 also has a feed unit 20 for feeding in second carbon black base particles 22. Also provided is a compaction unit 24 in the form of a pelletizing system 26 for joint compaction of the first and second carbon black base particles 16, 22 in the apparatus 10. Downstream of the pelletizing system 26 follows a drying unit 28. Disposed in the feed unit 20 is a grinding unit 30 in which the second carbon black base particles 22 are ground.

The combustion oven 18 has a first supply tube 32 with which gas is supplied to the combustion oven 18, and a 2nd supply tube 34 with which air is supplied to the combustion oven 18. The supply tubes 32, 34 are thus used to produce a gas/air stream 36 which, having been brought to a high temperature between 1200° C. and 1800° C., via a third supply tube 38, burns mineral oil 40 fed into the combustion oven 18.

Burning of the mineral oil 40 in the combustion oven 18 forms free carbon which is borne by the gas/air stream into a cooling unit 42, where it is cooled rapidly with water 44 which is injected via a nozzle 46 into the cooling unit 42. The rapid cooling gives rise to the first carbon black base particles 16 which, borne by the gas/air stream 36, form a particle stream 48 which enters the pelletizing system 26 directly.

Figure 2:
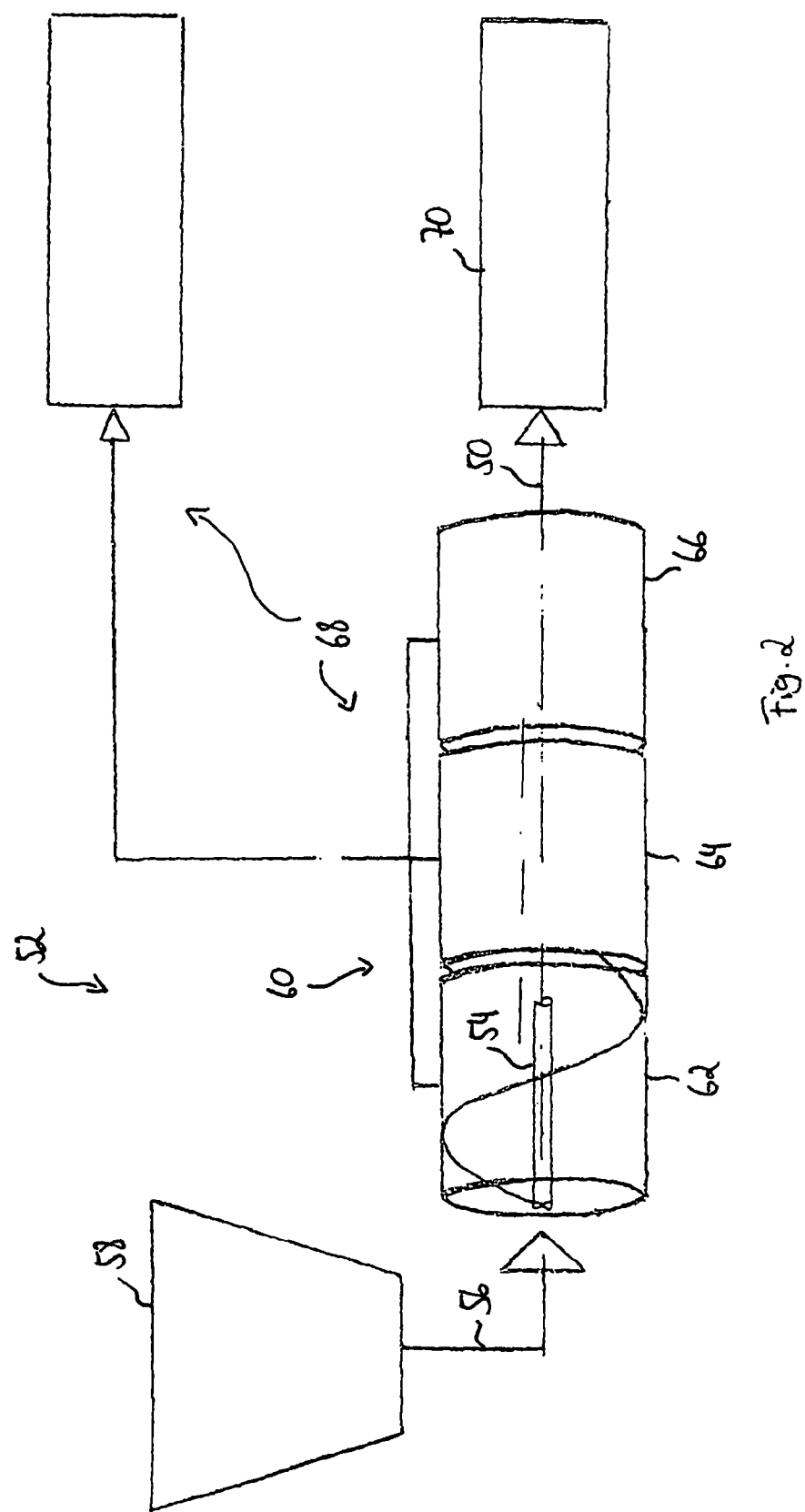
FIG. 2 shows an apparatus for production of recycled carbon black.

FIG. 2 shows the production of a pyrolysis product 50 which is introduced via the feed unit 20 into the particle stream 48 of the first carbon black base particles 16.

Within a pyrolysis oven 52 is a screw 54 which transports, for example, shredded used tires as product granules 56 through the pyrolysis oven 52. Via a funnel 58, the shredded used tires are introduced into the pyrolysis oven 52 without affecting the pressure conditions in the pyrolysis oven 52, wherein there is a reduced pressure atmosphere.

The pyrolysis oven 52 has three heating zones 60 in which the product granules 56 are heated at different temperatures. In a first heating zone 62 there is a temperature between 100° C. and 200° C. In a second heating zone 64 there is a temperature between 200° C. and 350° C. And in a third heating zone 66 there is a temperature between 300° C. and 600° C. In each of the three heating zones 62, 64, 66, oils with different mass weight are volatilized and extracted using a condensation system 68.

This refined pyrolysis product 50 is then introduced into the feed unit 20 in FIG. 1 and ground in the course of transport into the particle stream 48 in the grinding unit 30 to give the second carbon black base particles 22. This involves grinding the pyrolysis product 50 until second carbon black base particles 22 having a particle size between 2 µm and 10 µm have formed.

The feed unit 20 opens into the cooling unit 42, such that the first carbon black base particles 16 formed therein are mixed homogeneously with the second carbon black base particles 22 supplied. However, it is also possible for the feed unit 20 to open into the combustion oven 18 upstream of the nozzle 46.

The first and second carbon black base particles 16, 22 are present in the particle stream 48 downstream, beyond the feed unit 20. These are blown into the pelletizing system 26 together by the kinetic energy present in the particle stream 48 and compacted therein to pellets 72. They are transported further into the drying unit 28, where water 44 which has been used for cooling and for pelletizing is removed from the pellets 72.

Figure 3:
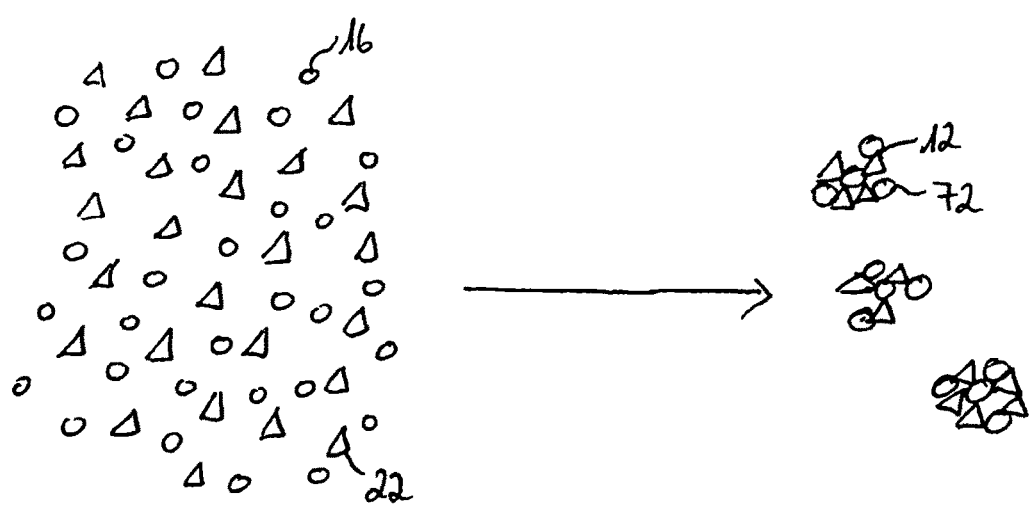
FIG. 3 shows the joining of first and second carbon black base particles to form hybrid carbon black particles.

The process for producing the hybrid carbon black particles 12 is illustrated once more in FIG. 3. A particle stream 48 in which first carbon black base particles 16 and second carbon black base particles 22 are present in homogeneous distribution is compacted in the pelletizing system 26 to form pellets 72, each pellet 72 including both first carbon black base particles 16 and second carbon black base particles 22.

Therefore, hybrid carbon black particles 12 have formed, having a desired mixing ratio of the first and second carbon black base particles 16, 22 in each hybrid carbon black particle 12.

To date, recycled carbon black obtained by means of pyrolysis was of low quality and was used at most as a filler in road construction, etc.

A pyrolysis process for used tire granules which is known from WO 2011/035812 A1 enables the industrial production of recycled carbon black which, because of its high quality, can be used again in rubber and tire production.

Recycled carbon black has different particle sizes because of the process regime in the pyrolysis. In order to obtain a defined maximum particle size and hence a good distribution of recycled carbon black in a rubber mixture, it is possible to grind recycled carbon black. However, ground recycled carbon black, just like standard carbon black, has a very low density and a very high volume. Products having very low density are difficult to store, convey or transport. Therefore, standard carbon black is pelletized for better handling. It is also possible to pelletize ground recycled carbon black in just the same way as standard carbon black, and it thus has good storability, conveyability and transportability.

The increasing differentiation of rubber mixtures and admixtures of silicates specifically in the last 5 to 10 years is giving rise to pyrolysis end products having different compositions and in particular different silicate contents. For the industrial production of tires, however, a very substantially constant composition is advantageous. Balancing of the chemical composition and hence constant chemical characteristics in the compounding of rubber mixtures can be achieved, for example, by means of blending (mixing) recycled carbon black with standard carbon black.

Simple mixing of different pellets prior to transport leads to unwanted bursting-open of the pellets.

However, the invention includes a process and an apparatus for mixing recycled carbon black with standard carbon black prior to transport.

Since ground recycled carbon black tends to agglomerate in the course of prolonged storage, it can be fed directly into the standard process prior to pelletization with the inventive apparatus, in order thus to be pelletized together with standard carbon black.

The drying apparatus usually used for the production of standard carbon black, in industrial operation, is set up for the size of the throughput through the furnace oven and cannot be operated with a lower throughput.

The solution to this problem is the mixing apparatus with a mill for grinding recycled carbon black, which is preferably present downstream of the quenching at the outlet of the furnace combustion chamber upstream of the pelletization, or at the transition to the pelletizing apparatus, and the amount of recycled carbon black by which the output of the furnace process has been reduced is fed in by exact metered addition. Alternatively, the feed of recycled carbon black can also be blown in alongside the oil at the start of the furnace combustion chamber and be flushed through the furnace process in addition. This may result in additional upgrading of the ground recycled carbon black.

List of reference numerals

10 Apparatus
12 Hybrid carbon black particles
14 Production unit
16 First carbon black base particle
18 Combustion oven
20 Feed unit
22 Second carbon black base particle
24 Compaction unit
26 Pelletizing system
28 Drying unit
30 Grinding unit
32 First supply tube
34 Second supply tube
36 Gas/air stream
38 Third supply tube
40 Mineral oil
42 Cooling unit
44 Water
46 Nozzle
48 Particle stream
50 Pyrolysis product
52 Pyrolysis oven
54 Screw
56 Product granules
58 Funnel
60 Heating zones
62 First heating zone
64 Second heating zone
66 Third heating zone
68 Condensation system
70 Refining system
72 Pellet

The invention claimed is:

1. An apparatus for production of hybrid carbon black particles, comprising a production unit for generating a particle stream of first carbon black base particles, a feed unit for feeding second carbon black base particles to the particle stream and a compaction unit for pelletizing the first and second carbon black base particles to give hybrid carbon black particles, wherein the feed unit has a grinding unit for generating the second carbon black base particles by grinding a pyrolysis product based on carbon.

2. The apparatus of claim 1, including a drying unit for drying the hybrid carbon black particles.

3. The apparatus of claim 1, wherein the grinding unit is disposed in the feed unit for grinding of the pyrolysis product.

4. The apparatus of claim 1, wherein the production unit for production of the first carbon black base particles is in the form of a combustion chamber.

5. The apparatus of claim 4, wherein the combustion chamber has a first supply tube with which gas is supplied to the combustion chamber, and a second supply tube with which air is supplied to the combustion chamber.

6. The apparatus of claim 1, further comprising a cooling unit including a nozzle.

7. The apparatus of claim 6, wherein the nozzle can be used to inject water into the cooling unit.

8. The apparatus of claim 6, wherein the grinding unit is positioned downstream of the cooling unit at an outlet of the combustion chamber.

9. The apparatus of claim 6, wherein the grinding unit is positioned downstream of the cooling unit at the transition to the compaction unit.

10. The apparatus of claim 1, wherein the feed unit is positioned at a start of the combustion chamber.

* * * * *